Jan. 19, 1965 SUSUMU NOJIMA 3,166,717

AREA BALANCED WAVEFORM GENERATOR

Filed Jan. 22, 1960 2 Sheets-Sheet 1

INVENTOR
SUSUMU NOJIMA
BY [signature]
ATTORNEY

INVENTOR
SUSUMU NOJIMA
BY Eugene E. Geoffrey Jr.
ATTORNEY

United States Patent Office 3,166,717

Patented Jan. 19, 1965

3,166,717

AREA BALANCED WAVEFORM GENERATOR

Susumu Nojima, Tokyo, Japan, assignor to Anritsu Dempa Kogyo Kabushiki Kaisha, Setagaya-ku, Tokyo, a company of Japan Filed Jan. 22, 1960, Ser. No. 4,043

7 Claims. (Cl. 328—67)

This invention relates to the generation of waveforms and more specifically concerns a new and improved generator for producing area-balanced waveforms to facilitate the transmission of unidirectional pulses and other similar waveforms through reactive devices such as transformers and the like.

The improved generator in accordance with this invention is particularly useful in connection with the development of a sweep signal for resolved time-base methods of operating cathode ray planned position indicators as generally used in radar systems to achieve a high degree of precision and stability.

The difficulties heretofore encountered with resolved-time-base systems has been occasioned by the need for providing a D.C. level so that the central point about which the sweep beam will rotate on the cathode ray tube will correspond to a zero level of the A.C. components of the current flowing through the deflection coil. To attain this end it is necessary to provide an area-balanced current waveform and the maintenance of area-balance has heretofore necessitated the utilization of relatively complicated circuitry. Present known techniques for the attainment of this end are described in vols. 19 and 22 of the Radiation Laboratory Series and proposed circuits for the attainment of these ends are shown on pages 323, 453 and 462 of vol. 19 and page 455 of vol. 22.

Accordingly one object of the invention resides in the provision of a novel and improved method and apparatus which overcomes the difficulties encountered with prior known circuits and provides a new and improved generator and method of operation that is characterized by its simplicity, stability and dependability.

Another object of the invention resides in the provision of a novel and improved system for the generation of area-balanced current waveforms particularly useful in connection with planned position indicators of the type generally used with radar equipment.

A still further object of the invention resides in a novel and improved area-balanced waveform generator that will facilitate the transmission of the generated signal through reactive loads.

The above and other objects and advantages of the invention will become more apparent from the following description and accompanying drawings forming part of this application.

Referring now to the figures and more specifically to

Figure 1:
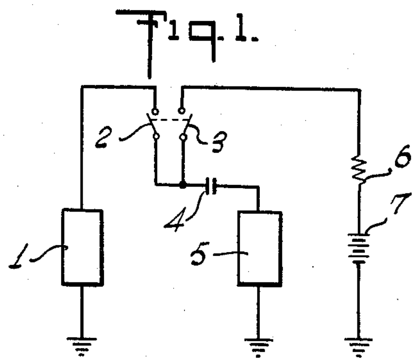
FIG. 1 is a block diagram of an area-balanced waveform generator illustrating the principle of operation of this invention.
Figure 2:
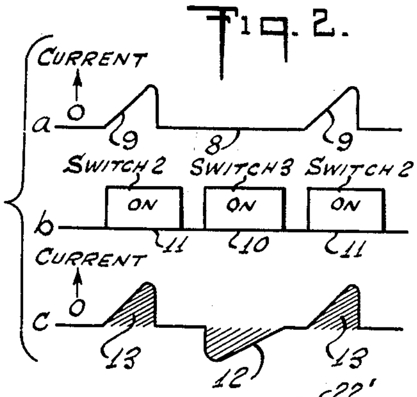
FIG. 2 is a graphical illustration of the operation of the circuit shown in FIG. 1.

FIG. 1, the numeral 1 denotes a unidirectional waveform generator as, for instance, a saw-tooth generator and the waveform is illustrated in graph *a* of FIG. 2. The saw-tooth pulses are denoted by the numeral 9, while the zero current line is denoted by the numeral 8. If this signal were to be fed through a transformer, it is evident that the zero current line would be no longer positioned at the base of the saw-tooth pulse 9, but would lie at a point intermediate the bases and peaks of these pulses. The zero A.C. current reference can be maintained at the position shown in graph *a* by introducing negative pulses wherein the area of each negative pulse corresponds to the area of each positive pulse, and this can best be understood from the operation of the simplified circuit shown in FIG. 1. For this purpose the signal from the generator 1 is fed through a switch 2 and condenser 4 to a transformer or reactive load 5. A second signal is provided by a D.C. source such as the battery 7 and the voltage of this battery is impressed across the load 5 in series with a resistor 6, a second switch 3, and the condenser 4. The switches 2 and 3 are coupled together so that when one switch is closed the other is open, and vice versa.

In the operation of the circuit of FIG. 1, when the switch 2 is closed the signal produced by the generator 1 is fed through the condenser 4 to the transformer 5 and this signal may be represented by one of the pulses 9 shown in graph *a* of FIG. 2. When the first pulse 9 has been transmitted to the load, the switch 2 is opened and a charge remains on condenser 4. The switch 3 is then closed and a current will flow from the battery 7 through the resistor 6 and condenser 4 and the load 5 and this current will produce a negative pulse denoted by the numeral 12 in graph *c* of FIG. 2, the magnitude of which will be influenced by the charge on condenser 4. It will be observed that the switches are coordinated in this operation as shown in graph *b* of FIG. 2, so that the switch 2 is "on" during a time 11 when a pulse 9 of graph *a* or 13 of graph *c* is being transmitted by the generator 1. The switch 2 then opens whereupon the switch 3 closes during a time 10, as indicated in graph *b*. This procedure is repeated to produce a continuous area-balanced waveform.

The negative pulses as illustrated in graph *c* of FIG. 2 are controlled in area by the amount of the charge accumulated by condenser 4 during the time the switch is closed. Since both signals are fed through the same condenser, the negative pulse current through the condenser will be a function of the charge which remained on the condenser after the transmission of a positive pulse from the generator 1, and it has been found in actual practice that the charging current, for instance, when switch 3 is closed, will increase or decrease depending on the amplitude of the signal from the generator 1, so that both the positive and negative pulses 13 and 12 of graph *c* of FIG. 2 will automatically balance with reference to their area.

While the current waveforms described in connection with FIGS. 1 and 2 are saw-toothed, it is evident that the same ends may be attained with other types of waveforms. Further, the resistor 6 of FIG. 1 is included merely to limit the current flow from the battery 7.

The switch 2 of FIG. 1 was shown for the purpose of illustrating the principle of the invention, though it is evident that the switch 2 could be eliminated, since the generator 1 produces a series of spaced unidirectional pulses and that during the period between successive pulses the voltage output of the generator is zero. Thus, the switch 2 could be eliminated and the operation of the switch 3 coordinated with the frequency of the generator 1.

Figure 3:
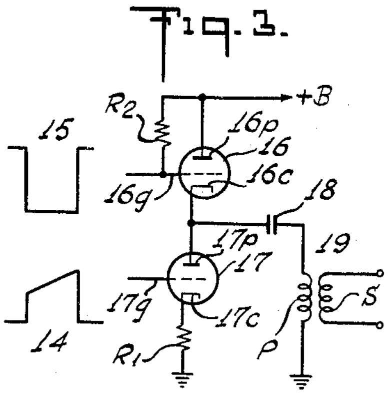
FIG. 3 illustrates one embodiment of an electronic circuit for generating an area-balanced waveform.

FIG. 3 illustrates one embodiment of a circuit in accordance with the invention for the generation of an area-balanced current waveform. In this figure the waveform 14 illustrates the character of the signal applied to the grid 17_g_ of the tube 17 and corresponds to the signal provided by the generator 1 of FIG. 1. The waveform 15 is a switching waveform and would correspond to the signal produced by the closing of switch 3 of FIG. 1. The signal 14 fed to the grid 17_g_ is amplified by the tube 17 which has its cathode 17_c_ connected to ground through a resistor R1. The plate 17_p_ of tube 17 is connected to the cathode 16_c_ of tube 16, while the plate 16_p_ of that tube is connected to the positive terminal of a voltage source, the negative terminal of which is grounded. The grid 16_g_ of tube 16 receives the switching signal 15. This signal is in the form of a series of negative pulses and the grid 16_g_ is positively biased by a resistor R2 connected between the grid and the plate 16_p_. The output circuit includes a condenser 18 having one terminal connected to the cathode 16_c_ and the other terminal connected to ground through the primary _p_ of transformer 19. The output signal will appear across the secondary _s_ of the transformer.

The triode 17 acts as an amplifier tube while the triode 16 operates as a switching tube, the latter corresponding to the switch 3 of FIG. 1. In operation, the waveforms 14 and 15 are synchronized so that during the presence of the negative signal on the grid 16_g_, the tube 16 will draw substantially zero current. Under this condition, and assuming a charge on condenser 18, the tube 17 will function to apply a unidirectional pulse, amplified form of pulse 14, through the condenser 18 and the transformer 19 in series and the magnitude of the pulse will be a function of the magnitude of the charge on condenser 18. At the conclusion of the pulse 14 the pulse 15 returns to zero, at which point the tube 16 draws current and will apply a signal to the transformer through the condenser 18. During this period the tube 17 is non-conducting. This circuit therefore functions in the same manner as the form of the invention shown in FIG. 1, and, if desired, the tube 17 could be arranged as a signal generator rather than as a signal amplifier, as described above.

Figure 4:
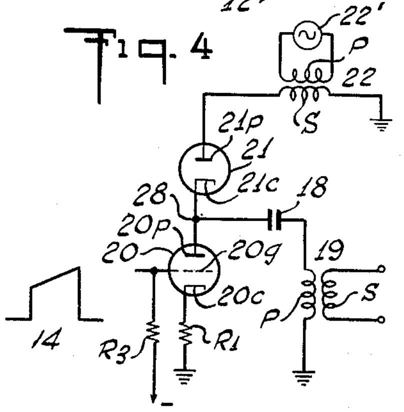
FIG. 4 illustrates a modified electronic circuit for the generation of area-balanced waveforms.

The form of the invention shown in FIG. 4 differs from FIG. 3 in that the triode 16 is replaced by a diode 21 and an alternating current source is utilized in place of a direct current source. More specifically, this circuit includes a triode 20 having the cathode 20_c_ connected to ground through a resistor R1. The grid 20_g_ to which a unidirectional signal 14 is applied is connected to a source of negative bias voltage through a resistor R3. The plate 20_p_ is connected by means of terminal 28 to cathode 21_c_ of the tube 21 and the plate 21_p_ is connected through the secondary _s_ of transformer 22 to ground. The primary _p_ of transformer 22 is connected to a source of alternating current 22'. The output circuit includes the condenser 18 and the primary _p_ of the transformer 19 with the resultant signal appearing across the secondary _s_ of transformer 19.

Figure 5:
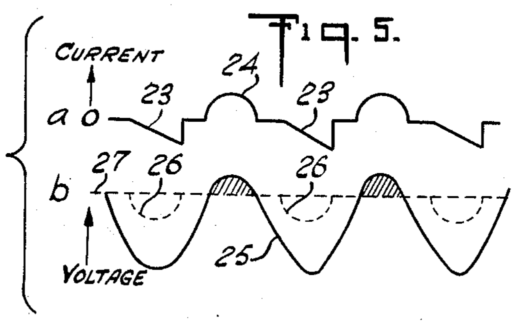
FIG. 5 is a graphical illustration of the waveforms produced by the circuit of FIG. 4.

In operation of the circuit of FIG. 4, the input signal to the grid 20_g_ of tube 20 is synchronized with the A.C. current produced by the transformer 22 so that the plate 21_p_ will be negative when a pulse 14 is applied to the grid of the tube 20. This phase relationship is shown in the graph _a_ of FIG. 5. With this arrangement and with the current flowing in the secondary of the transformer 22 being polarized to make the plate 21_p_ of the tube 21 positive, the tube 21 will conduct and current will flow through the condenser 18 and the primary of the transformer 19 to produce a current pulse 24 as illustrated in graph _a_ of FIG. 5. When the current produced by the transformer 22 is negative with respect to the plate 21_p_, the tube 21 is non-conducting and during this period the pulse 14 is applied to the tube 20. The charge remaining on the condenser 18 provides the energy for the amplification of the pulse 14. Under these conditions the peak amplitude of the current wave produced by the signal 14 is a direct function of the charge remaining on the condenser 18 when the diode 21 becomes non-conducting. Thus should the area of the pulse 24 produced by diode 21 be less than the area of the pulse 23, the potential at the point 28, by reason of the charge on the condenser 18, will be reduced and cause the next successive pulse 24 to decrease in amplitude. In this way the pulses will automatically balance one another so that the area of the pulses 23 and 24 will be identical. Furthermore, the conducting and non-conducting conditions of the diode 21 are determined by the character of the diode and the voltage applied thereto. Thus, by properly selecting a diode, the conducting period can be arranged to comprehend but a small portion of the positive half-cycle of the alternating current as shown by curve 25 in graph _b_ of FIG. 5. This operation can also be attained by applying an appropriate bias to the diode as, for instance, a D.C. biasing voltage applied in series with the secondary of the transformer 22.

Figure 6:
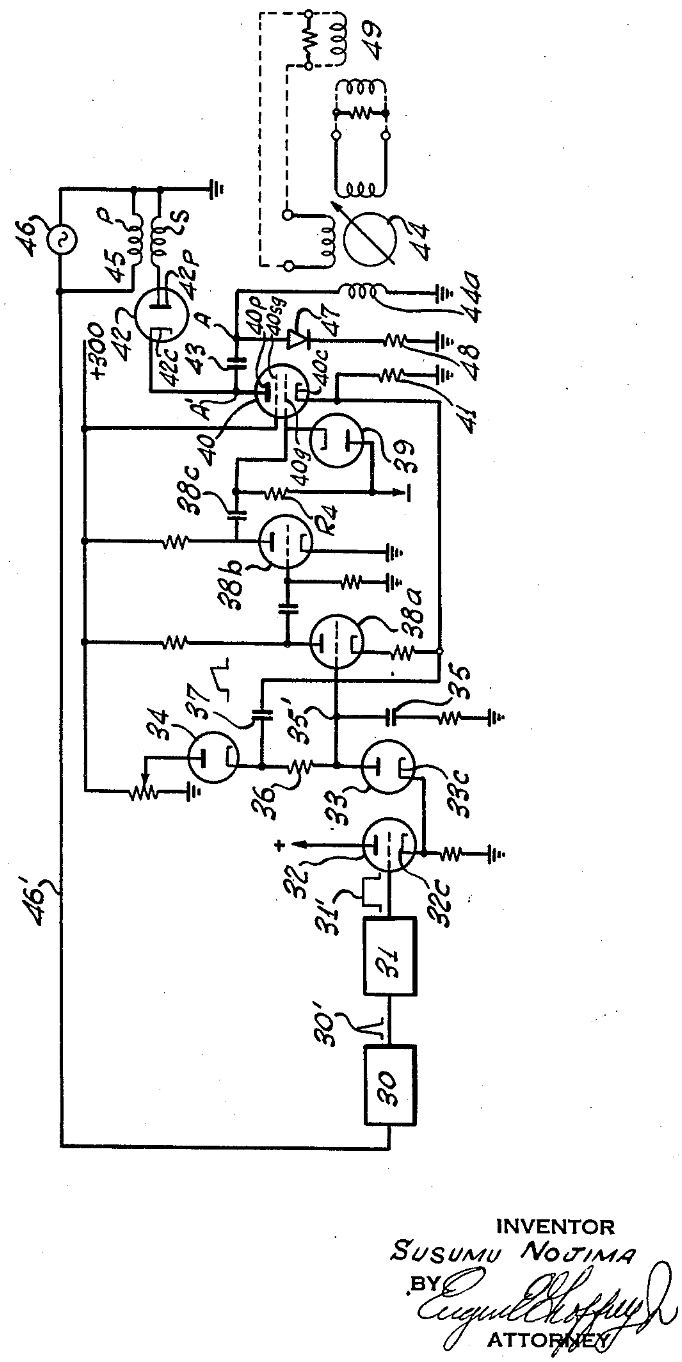
FIG. 6 is a circuit in accordance with the invention illustrating its use as a sweep generator for a cathode ray planned position indicator.

FIG. 6 illustrates the embodiment of the invention in a resolved-time-base circuit. In this embodiment of the invention the tubes 40 and 42 correspond generally with the tubes 20 and 21 of the circuit of FIG. 4 and are arranged to energize a resolver 44 connected with the fixed deflection yoke 49 of a cathode ray tube. More specifically, the circuit includes a trigger current generator 30 for producing a voltage pulse such as that denoted by the numeral 30' in synchronism with an A.C. source 46, the latter being interconnected by a lead 46' to the generator 30 for effecting this synchronization. The output of the generator 30 controls a square wave or gate generator 31 producing an output signal as illustrated at 31'. The tubes and other circuit elements 32 through 41 comprise a sweep generator circuit and corresponds essentially to the circuit shown on page 366 of vol. 22 of the MIT Radiation Series referred to above.

More specifically, the tube 32 is a cathode follower in which the output signal from the cathode 32_c_ is connected to the cathode 33_c_ of a switching tube 33. The tube 34 is a charging diode for the condenser 35 and the time constant of the circuit is determined by the condenser 35 and resistance 36 to obtain a saw-tooth wave of the desired sharpness at the terminal 35' of the condenser 35. This saw-tooth wave is amplified in a conventional manner by the tubes 38_a_ and 38_b_ which are illustrated as being energized by a 300 volt source of direct current. The output of tube 38_b_ is fed through a condenser 38_c_ to the grid 40_g_ of the tube 40. In addition, the resistor R4 in parallel with the diode 39 is connected from the grid 40_g_ to a negative terminal of a D.C. supply to bias the grid 40_g_ and at the same time insure the application of unidirectional signals to the grid 40_g_. The tube 40 corresponds to the tube 20 of FIG. 4 except that the tube 40 is illustrated as a tetrode and the screen grid 40_sg_ is connect directly to the 300 volt source used to energize the other elements of the amplifier as previously described. The cathode 40_c_ is connected to ground through a resistor 41 and is further connected to the cathode of the tube 38_a_ to obtain voltage feed back of the character utilized in the well known "bootstrap linear sweep generator." The plate 40_p_ of the tube 40 is connected through the terminal A' to the cathode 42_c_ of the diode 42 and the plate 42_p_ is connected through the secondary _s_ of transformer 45 to ground. The primary 45_p_ of transformer 45 is energized by the alternating current source 46.

The generated area-balanced waveform is obtained from the terminal A' and is fed through the condenser 43 which corresponds to the condenser 18 of FIG. 4 and thence through the input winding of the resolver 44. A diode 47 in series with a resistor 48 is connected from the terminal A to ground.

Figure 7:
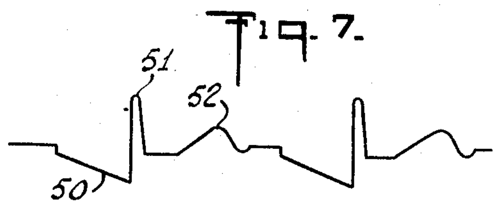
FIG. 7 is a graphical illustration of the area-balanced waveform produced in the circuit of FIG. 6.

The operation of the triode 40 and diode 42 is substantially identical to the operation of the circuit shown in FIG. 4 and accordingly a detailed description of the operation of these specific elements is not deemed necessary. This circuit, however, differs from the circuit of FIG. 4 in the utilization of the diode 47 and resistor 48. These elements are included as the potential difference between points A and A' may fluctuate in the manner illustrated by the graph of FIG. 7. It will be observed that following the saw-tooth wave pulse 50 there is a very steep pulse 51 of large amplitude which may result by reason of the fact that the load, and specifically the deflecting coil 49 is inductive. By the utilization of the diode 47 properly polarized with reference to the terminal A, the diode will conduct during the presence of the peak voltage 51 and thereby suppress it so that it will not interfere with the proper operation of the circuit.

The resolver 44 is illustrated in FIG. 6 as a two phase system and feeds horizontal and vertical deflection coils forming part of the yoke 49. It is evident, however, that while a two phase system is illustrated, for simplicity, a poly-phase system well known in the art would be preferred.

From the foregoing description, it is evident that with this invention an area-balanced waveform is produced which will automatically maintain its balance by the action of the condenser such as the condenser 18 of FIG. 4, since the total charge obtained from the coupling condenser by the waveform generator is equal to the time integral of the current intensity flowing through the load from a second energy source. Thus, for instance, as described in connection with FIG. 1, the charges accumulated on the condenser from the D.C. course when the generated waveform is a zero potential is equal to the charge consumed from the condenser during amplification of the generated waveform.

While only certain embodiments of the invention have been illustrated and described, it is evident that modifications, alterations and changes may be made without departing from the true scope and spirit thereof as defined by the appended claims.

What is claimed is:

1. An area balanced current wave form generating apparatus comprising a first amplifying device having a control electrode, an output electrode and a common electrode, a condenser and load connected in series, a connection between said condenser and said output electrode, a connection between said load and said common electrode, means in circuit with said common and control electrodes to make said control electrode negative with reference to said common electrode, a generator for producing successive pulses spaced in time, means connecting said generator between said common electrode and said output electrode, means for applying a second set of pulses spaced in time to said control electrode, the first said pulses being phased with the second set of pulses with the first said pulse generator being activated during the interval between successive pulses of said second set and applies energy pulses to said load to charge said condenser, then during the presence of each pulse of the second set said generator is inactivated and said device produces an energy pulse through the condenser and load corresponding in form to the pulse applied to the control electrode of said amplifying device, the first said energy pulses being of a polarity opposite to the second said energy pulses and of an area equal to the first said energy pulses.

2. Generating apparatus according to claim 1 wherein said amplifying device is a three element vacuum tube with the common electrode being the cathode, the control electrode being the grid and the output electrode being the plate.

3. Generating apparatus according to claim 1 wherein said generator includes an amplifying device having control, output and common electrodes with said common electrode being connected to the output electrode of the first said device, pulsing means connected to the control electrode of the last said device and a direct current energy source connected between the common electrode of the first said device and the output electrode of the last said device.

4. Generating apparatus according to claim 1 wherein said generator includes a source of alternating current and a half wave rectifier connected with said source.

5. Generating apparatus according to claim 1 including a diode connected in parallel with said load.

6. Area balanced current waveform generator comprising a pulse generator producing unidirectional current pulses spaced in time, a load, a charge accumulating condenser connecting said generator and load said generator producing current pulses in said load and leaving a charge on said condenser at the conclusion of each pulse, and pulse producing means operable independently of said pulse generator and connected to said condenser and energized by said accumulated charges during the intervals between successive pulses of said generator and producing current pulses through said load of a polarity opposite to that of the first said pulses and of substantially equal area.

7. An area balanced current waveform generator according to claim 6 wherein said pulse generator includes an alternating current power source and a diode connected with said source for producing said unidirectional current pulses.

References Cited in the file of this patent

UNITED STATES PATENTS

| | | |
|---|---|---|
| 2,409,897 | Rado | Oct. 22, 1946 |
| 2,516,135 | Moore | July 25, 1950 |
| 2,589,807 | Higinbotham | Mar. 18, 1952 |
| 2,720,646 | Berger | Oct. 11, 1955 |
| 2,761,131 | Rae | Aug. 28, 1956 |
| 2,771,556 | Anderson et al. | Nov. 20, 1956 |
| 2,783,314 | Reaves | Feb. 26, 1957 |
| 2,897,356 | Gray | July 28, 1959 |
| 2,919,379 | Frame et al. | Dec. 29, 1959 |
| 2,942,169 | Kalfaian | June 21, 1960 |

FOREIGN PATENTS

| | | |
|---|---|---|
| 138,672 | Australia | Sept. 14, 1950 |